United States Patent
Lambiase

(10) Patent No.: US 6,618,477 B1
(45) Date of Patent: Sep. 9, 2003

(54) SYSTEM AND METHOD FOR NON-INTRUSIVELY DISPLAYING INFORMATION TO A USER IN A TELECOMMUNICATIONS SYSTEM

(75) Inventor: Eric Lambiase, Rockwall, TX (US)

(73) Assignee: Concerto Software, Inc., Westford, MA (US)

( * ) Notice: Subject to any disclaimer, the term of this patent is extended or adjusted under 35 U.S.C. 154(b) by 0 days.

(21) Appl. No.: 09/247,719

(22) Filed: Feb. 9, 1999

(51) Int. Cl.$^7$ .......................... H04M 3/00; H04M 5/00; H04M 1/56
(52) U.S. Cl. .............................. 379/265.02; 379/142.17
(58) Field of Search ........................ 379/265.01–265.14, 379/266.1, 309, 93.23, 142.01, 142.18; 709/200, 201, 202

(56) References Cited

U.S. PATENT DOCUMENTS

| | | | | |
|---|---|---|---|---|
| 5,544,232 A | * | 8/1996 | Baker et al. ............. | 379/88.25 |
| 5,999,609 A | * | 12/1999 | Nishimura ............. | 379/201.01 |
| 6,047,060 A | * | 4/2000 | Fedorov et al. .......... | 379/265.2 |
| 6,195,683 B1 | * | 2/2001 | Palmer et al. ............. | 709/204 |
| 6,198,814 B1 | * | 3/2001 | Gill ........................ | 379/266.01 |
| 6,449,356 B1 | * | 9/2002 | Dezonno ............... | 379/265.01 |

* cited by examiner

*Primary Examiner*—Benny Tieu
(74) *Attorney, Agent, or Firm*—Bourque & Associates, PA

(57) ABSTRACT

A system and method for non-intrusively displaying telephone call information to a user is used with an existing telecommunications system. The system and method obtains telephone call information, such as automatic number identification (ANI) information, when a telephone call is placed to the telecommunications system. The system and method non-intrusively displays the telephone call information to a user or agent in the telecommunications system, for example, by displaying the ANI information in a title bar of an active window on the agent's workstation. In one example, the system and method uses scripts, such as a bind function script to load an external module, such as a dynamic link library (DLL), and bind a display function from the external module for use in displaying the telephone call information. A display information script obtains the telephone call (ANI) information and displays that information using the display function bound from the external module. The system preferably includes a scripting engine that calls or executes the bind function script and display information script, and an event processor that instructs the scripting engine to execute the appropriate script upon the occurrence of an event, for example, upon start up of the system or upon detecting a telephony event, such as a telephone call.

24 Claims, 3 Drawing Sheets

SYSTEM AND METHOD FOR NON-INTRUSIVELY DISPLAYING INFORMATION TO A USER IN A TELECOMMUNICATIONS SYSTEM

FIELD OF THE INVENTION

The present invention relates to telecommunications systems and methods and in particular, to a system and method for non-intrusively displaying information to a user in a telecommunications system.

BACKGROUND OF THE INVENTION

Telecommunications systems, such as call centers, are used to process inbound and outbound telephone calls. Businesses and customer service organizations utilize a telephone call center to place and receive telephone calls to and from customers or potential customers, for example, for credit collection or telemarketing. Such telecommunications systems or call centers typically include a number of audio headsets and data terminals, such as computers, used by agents or operators to communicate with the called parties and calling parties. Using the data terminal or PC, the agents can view and/or enter call record data pertaining to the party (e.g., the customer or potential customer) and the transaction being made.

In a typical call center, when an incoming telephone call is received, an agent is selected based upon certain criteria, such as the type of call and the expertise of the agent, and the call is automatically routed to the selected agent. When a call is routed to the agent, the call center will typically transmit information pertaining to the call or the calling party to the agent automatically for review by the agent when handling the call.

Although this type of automated call center facilitates and speeds call processing by the agents, the transmission of information to the agent is done in a relatively intrusive manner. For example, the system may use a window dialog to display the telephone call information as the call is transferred. This technique, however, can present a problem with screen real-estate and can interrupt the focus/typing of the agent using the computer.

According to another technique, the information can be displayed by way of application integration using object linking and embedding (OLE), dynamic data exchange (DDE), transmission control protocol/internet protocol (TCPIP), high level language API (HLLAPI), and the like. However, these methods require that the target application have one or more of these integration points in order to pass the information. A further method of displaying this information uses the liquid crystal display (LCD) on the telephone. However, the information that can be displayed on the LCD is limited to what the PBX has programmed into it.

Accordingly, a need exists for a system and method of non-intrusively displaying information such as telephone call information to a user in a telecommunications system. In particular, a need exists for a system that allows integration of the information being displayed into any windows application title bar that currently has the Windows focus, allowing the call center agent to continue working without interruption while receiving the information about the calling party.

SUMMARY OF THE INVENTION

The present invention features a method for non-intrusively displaying telephone call information to a user in a telecommunications system including at least one computer running a windows-based operating system. The method comprises the steps of obtaining the telephone call information pertaining to a telephone call routed to the user by the telecommunications system, and displaying the telephone call information in a title bar of an active window on the computer used by the user to which the call is routed.

According to the exemplary embodiment, the method for non-intrusively displaying information to a user in the telecommunications system comprises the steps of executing a bind function script on the computer used by the user upon detecting a system start-up event, and executing a display information script on the computer used by the user upon detecting an occurrence of a telephony event. Executing a bind function script preferably includes loading an external module including a display function on the computer, and binding the display function in the external module to the display information script stored on the computer. The step of executing the display information script preferably includes the steps of obtaining telephone call information pertaining to a telephone call routed to the user by the telecommunications system, and displaying the telephone call information to the user using the display function.

According to the preferred embodiment, the computer is running a windows-based operating system and the external module includes a dynamic link library (DLL) having a windows text display function. The windows text display function preferably controls display of text in a title bar of an active window on a display of the computer used by the user, and the telephone call information is displayed in the title bar of the active window. The step of executing the display information script further includes replacing the telephone call information in the title bar with original title bar text. In one embodiment, the telephone call information includes automatic number identification (ANI) information.

The present invention also features a system for non-intrusively displaying telephone call information to a user in a telecommunications system. One embodiment of the system comprises a bind function script for loading the external module on the computer, and a display information script for displaying telephone call information to the user using the display function of the external module. The system further comprises an event processor for detecting a system start up event and at least one telephony event, and for receiving the telephone call information upon occurrence of the telephony event. The system further comprises a scripting engine, responsive to the system start up event, for executing the bind function script to load the external module having the display function, and responsive to the telephony event, for executing the display information script to display the telephone call information to the user at the computer using the display function.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
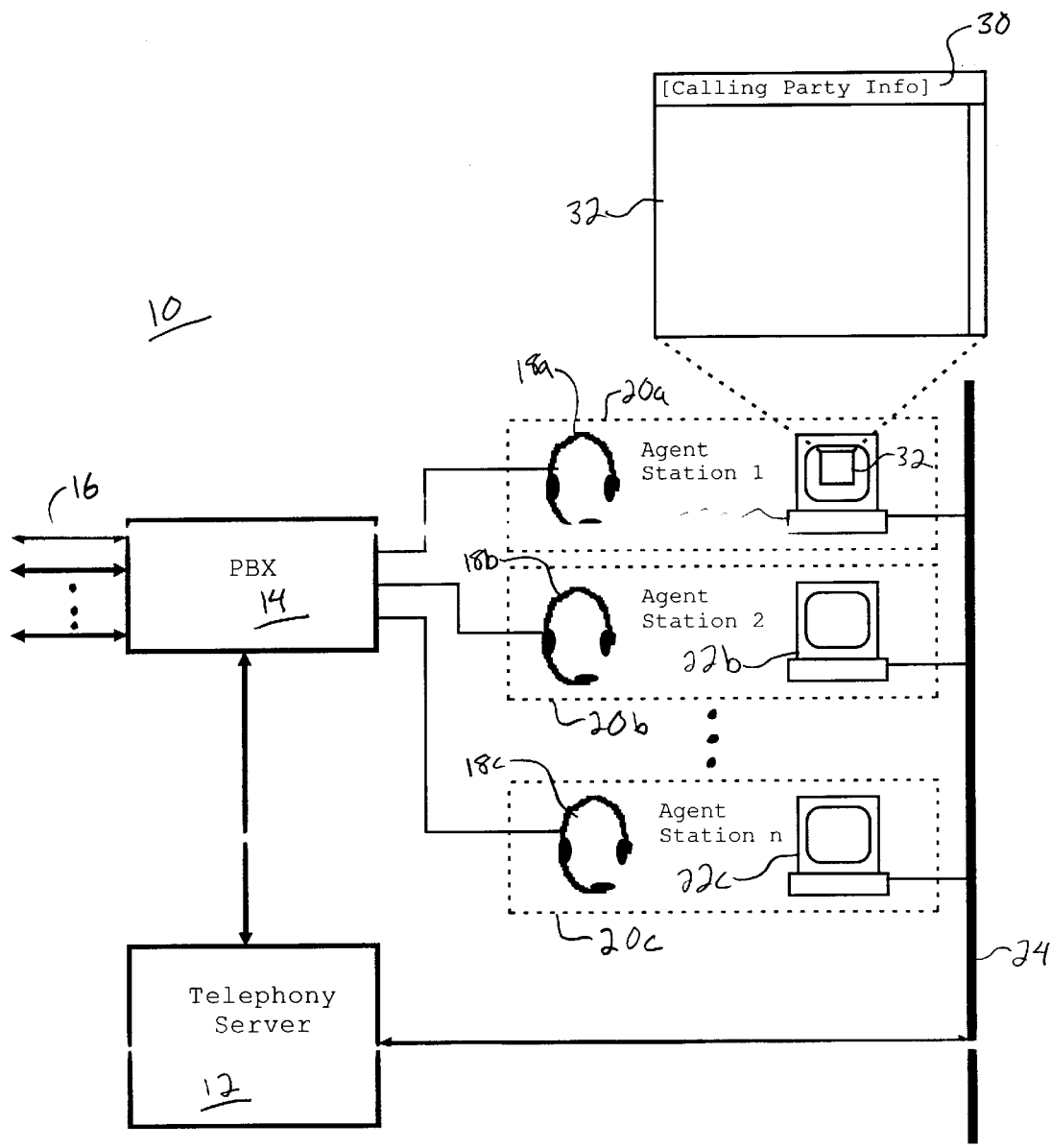
FIG. 1 is a schematic block diagram of a telecommunications system that uses the system and method for non-intrusively displaying telephone call information, according to the present invention.

The system and method of the present invention non-intrusively displays telephone call information to a user in a telecommunications system 10, FIG. 1. One example of the telecommunications system 10 comprises a telephony server 12 coupled through a computer telephone interface link to a private branch exchange (PBX) 14. The PBX 14 is coupled through a plurality of trunk lines 16 to a central office (not shown). The PBX 14 is also connected to audio communications devices 18a–18c such as telephones or headsets located at agent stations 20a–20c. The agent stations 20a–20c also include agent workstations 22a–22c, such as PCs or other types of data terminals having a display and input device. The workstations 22a–22c and the telephony server 12 are coupled to a local area network 24.

When the PBX 14 notifies the telephony server 12 of an incoming call, the telephony server 12 selects an appropriate agent at one of the agent stations 20a–20c to handle the call and instructs the PBX 14 to route the call to the selected appropriate agent. One example of this type of telecommunications system 10 and method of call routing is disclosed in greater detail in U.S. patent application Ser. No. 08/747,831, now U.S. Pat. No. 5,870,464, entitled Intelligent Information Routing System and Method, incorporated herein by reference. The present invention also contemplates using the system and method described below with other types of telecommunications systems and other methods for routing calls to appropriate agents.

The system and method of the present invention non-intrusively displays calling party information to a user or agent at one of the agent stations 20a–20c, for example, by displaying the calling party information in the title bar 30 of an active window 32 displayed at the agent's workstation 22a. In the exemplary embodiment, the calling party information includes automatic number identification (ANI) information pertaining to a call received from a calling party. When an incoming call is received by the PBX 14 and is routed to the appropriate agent station 20a by the telephony server 12, the ANI information is displayed at that workstation 22a in the title bar 30 of an active window 32. The user or agent at that agent station 20a is thereby notified of the incoming call with minimal intrusion on current tasks being performed by the agent at the workstation 22a.

Although the exemplary embodiment is described with respect to incoming calls, the present invention also contemplates non-intrusively displaying the telephone call information when outbound calls have been placed and assigned to an agent. Although the exemplary embodiment discloses displaying ANI information in the title bar of an active window, other types of telephone call information can be displayed in other regions of the active window or in other locations on the display of the workstation 22a.

Figure 2:
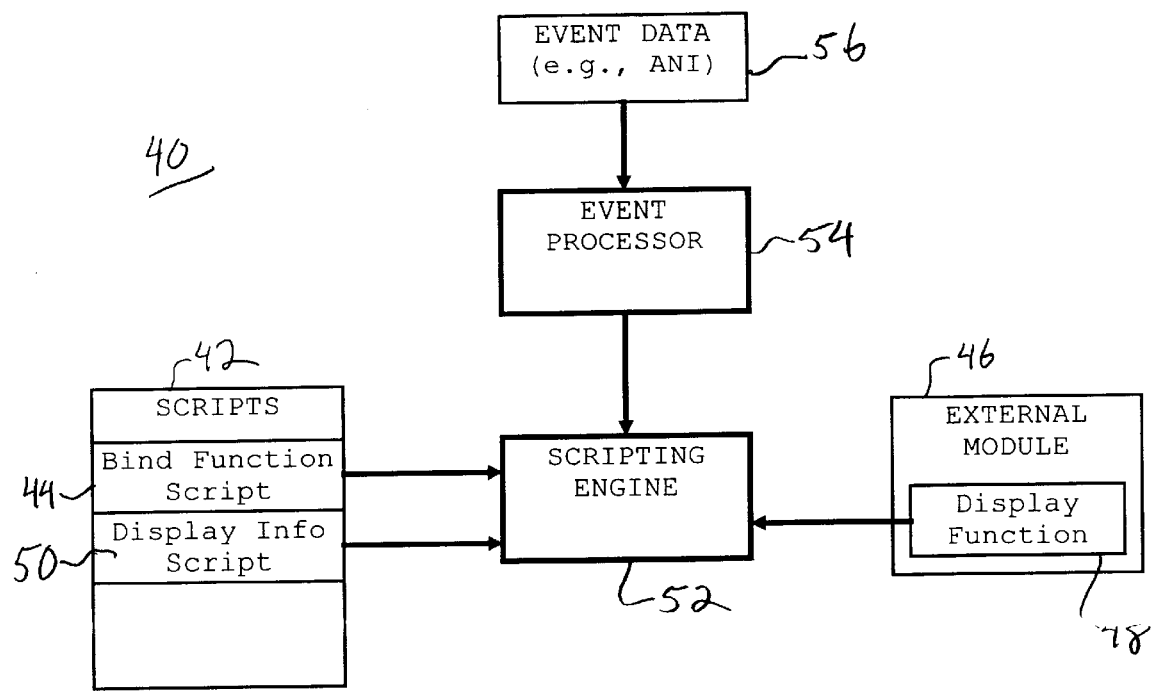
FIG. 2 is a functional block diagram of the system for non-intrusively displaying telephone call information, according to one embodiment of the present invention.

The preferred exemplary embodiment of the system 40, FIG. 2, for non-intrusively displaying telephone call information includes scripts 42 that are executed by the workstations 22a–22c. A bind function script 44 is used to load an external module 46 having a display function 48 that is used to display the telephone call information. In one example, the workstations 22a–22c include PC's running a windows-based operating system, and the external module 46 is a dynamic link library (DLL) module that includes a windows text display function 48. Where the Microsoft WINDOWS 95 or WINDOWS NT operating systems are used, the bind function script 44 binds in a function from the Microsoft USER32.DLL and incorporates a display function that enables the display information script 50 to change the text in the title bar on a window of a WINDOWS 95 or WINDOWS NT desktop. The scripts 42 also include a display information script 50 that is used to obtain the telephone call information and display the telephone call information using the display function 48.

The creation and execution of scripts that use external modules to provide a dynamic extensibility in a telecommunications system is disclosed in greater detail in U.S. patent application Ser. No. 08/747,831, now U.S. Pat. No. 5,870,464, incorporated herein by reference.

One example of the bind function script 44 is set forth in Example 1 below, and one example of the display information script 50 is set forth in example 2 below.

EXAMPLE 1

```
local $1,$0,$2
local huser32, szWindowtext
local nErr
if(IsAEShuttingDown( ) )then
    #unbind function
    nErr = UnBindFunction("SetWindowTextA", "SetWindowText")
    if (nErr <> 0) Then
        println "SetWindowText Function unbound"
    else
        println "SetWindowText Function NOT unbound."
    endif
    #unload DLL
    nErr = UnloadModule ("user32")
    if(nErr)then
        Println "Unloaded user32"
    else
        Println "ERROR: unloading user32."
    endif
else
    huser32 = LoadModule("user32", "user32")
    if (huser32 <> 0) then
        #bindfunction
        nErr = BindFunctionEx(huser32, "SetWindowTextA",
            "SetWindowText",
            "INT", 2, "INT", "STRING")
        if (nErr <> 0) then
            println "SetWindowText Function now available"
        else
            println "SetWindowText Function NOT available"
        endif
    else
        println "Error" Could not load User32.dll    !."
    endif
endif
```

EXAMPLE 2

```
local hWnd
local value
local $1, htel, ANI
htel = ICRLAtoi ($1)
ANI = TelGetANI (htel)
hwnd = GetForegroundWindow( )
value = GetTextFromWindow(hwnd)
SetWindowText(hwnd,"Call from " + ANI)
sleep (4000)
SetWindowText (hwnd, value)
```

The system 40 includes a scripting engine 52 that executes the scripts, for example, upon the occurrence of one or more events in the telecommunications system. An event processor 54 is linked to the scripting engine 52 to monitor the system for the occurrence of one or more events and to instruct the scripting engine 52 to execute the appropriate scripts upon the occurrence of the appropriate event. The event processor 54 monitors and processes events according to pre-defined rules. According to one rule, for example, the event processor 54 will instruct the scripting engine 52 to execute the bind function script 44 upon the detection of a system start up event. According to another rule, the event processor 54 will instruct the scripting engine 52 to execute the display information script 50 upon detecting a telephony event, such as the telephone ringing. Upon the occurrence of the telephony event, the event processor 54 receives event data 56, such as ANI information or other telephone call information, and passes that information to the scripting engine 52 for use in executing the scripts.

The scripting engine 52 and event processor 54 are preferably implemented as software running on the workstations 22a–22c. According to one example, the system 40 is implemented using a telecommunications software package that provides a rules-based system for executing scripts in response to events in a telecommunications system, such as the type known as SIXTH SENSE™ available from AnswerSoft, Inc. The scripts 42 and the external module 46 are also preferably stored on each of the workstations 22a–22c. Alternatively, the scripts 42, external module 46, scripting engine 52, and event processor 54 can be provided on a server, such as telephony server 12, coupled to the network 24. A workstation 22a–22c can then download the scripts and execute them as needed.

Although the exemplary embodiment of the system and method of the present invention uses scripts 42, scripting engine 52, and event processor 54, the present invention contemplates any means for obtaining the telephone call information and non-intrusively displaying the call information in the title bar of the active window on a user's computer.

Figure 3:
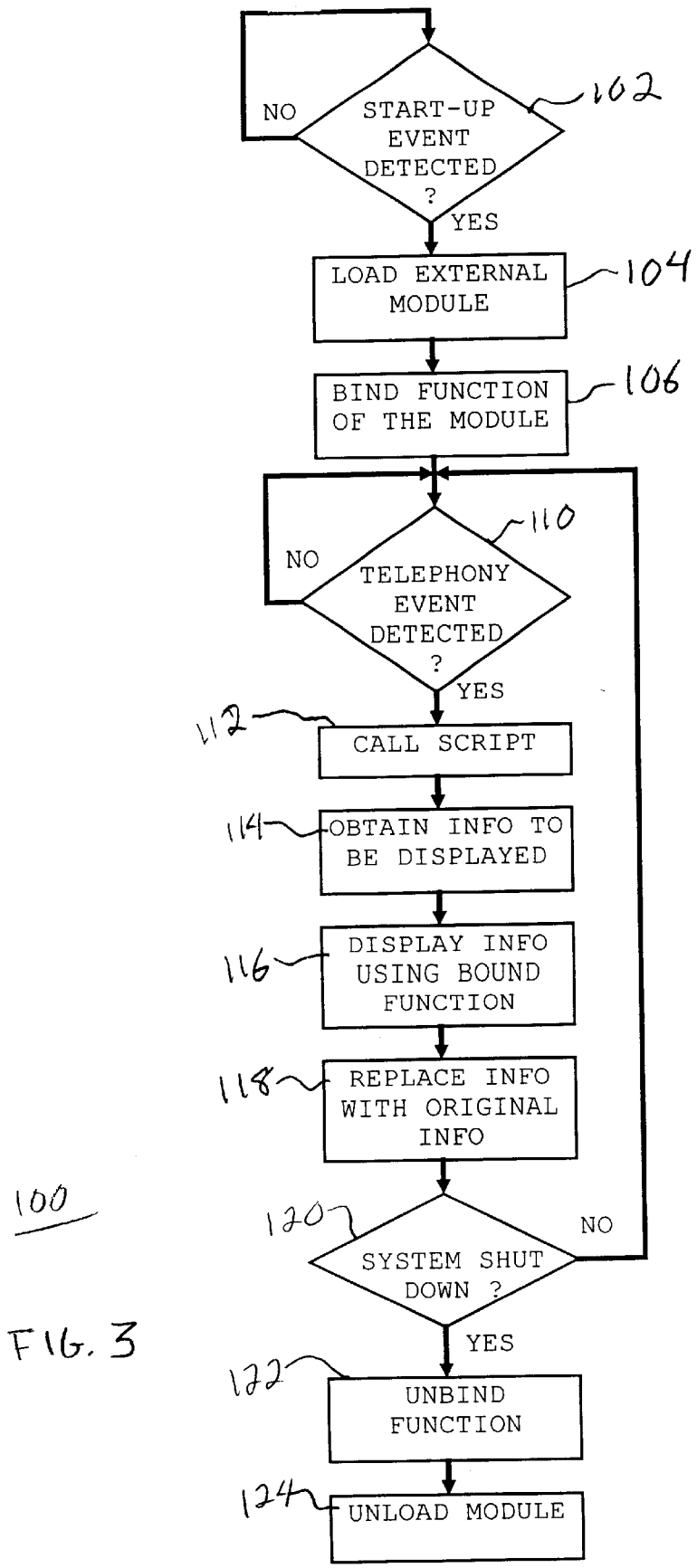
FIG. 3 is a flow chart of the method for non-intrusively displaying telephone call information, according to one embodiment of the present invention.

According to the exemplary method of 100, FIG. 3, of the present invention, when the startup event is detected, step 102, the external module 46 (e.g., USER32.DLL) is loaded, step 104. Next, the method binds the display function 48 of the external module 46 to the display information script 50, step 106.

After the external module has been loaded and the function is bound, the method waits for the detection of a telephony event, step 110, such as a telephone ringing. If the telephony event is detected, step 110, the display information script 50 is called or executed, step 112. The display information script 50 obtains the telephone call information to be displayed, step 114. In the exemplary telecommunications system, for example, when each telephony event occurs, information associated with that event, such as ANI information, is stored in a handle. The handle stores the information in global memory and makes it available to the display information script 50. The display information script 50 identifies the relevant handle for the telephone call to be routed to a particular agent and obtains the ANI information from that handle.

Next the telephone call information obtained from the handle is displayed to the agent to which the telephone call is to be routed using the display function 48, step 116. For example, the windows text display function is used to change the windows text in the windows application title bar that currently has the Windows focus to include the ANI or other telephone call information. The present invention also contemplates using the ANI information to retrieve other information pertaining to the telephone call of the calling/called party and displaying that information to the user or agent. For example, the ANI retrieved from the incoming call can be used to complete an SQL statement submitted via open database connectivity (ODBC) to locate a record. Caller information can then be retrieved from the record and can be displayed using the method described above.

The method preferably includes replacing the telephone call information with the original text displayed in the title bar of the window, step 118. Thus, the user or agent is notified of the telephone call without disrupting or interrupting the user or agent. The method can also include the step of detecting a system shut-down, step 120. Upon a detecting a system shut-down, the bind function script 44 unbinds the display function 48, step 122, and unloads the external module 46, step 124. Otherwise, the system will wait until another telephony event is detected, step 110.

Accordingly, the system and method of the present invention non-intrusively displays telephone call information, such as ANI information, to a user or agent without interrupting the agent from a current task being performed by the agent on the agent's workstation. The system and method can be incorporated into an existing telecommunications system that uses a scripting language to automate call processing. The system and method of the present invention also allows telephone call information to be displayed non-intrusively using existing windows display functions present on a windows-based operating system. This system and method is capable of reducing call time and providing cost effective integration with any windows application.

Modifications and substitutions by one of ordinary skill in the art are considered to be within the scope of the present invention which is not to be limited except by the claims which follow.

What is claimed is:

1. A method for non-intrusively displaying telephone call information to a user in a telecommunications system, wherein said telecommunications system includes at least one computer running a windows-based operating system, said method comprising the steps of:

obtaining said telephone call information pertaining to a telephone call routed to said user by said telecommunications system; and displaying said telephone call information in a portion of a pre-existing active window on said at least one computer used by said user to which said call is routed.

2. The method of claim 1 further comprising the step of loading an external module on said at least one computer, wherein said external module includes at least a display function, and wherein said display function is used to display said telephone call information in said title bar.

3. The method of claim 2 wherein said external module includes a dynamic link library (DLL) having a windows text display function.

4. The method of claim 2 wherein said external module is loaded upon detecting a system start-up event.

5. The method of claim 1 wherein said telephone call information is obtained and displayed upon detecting a telephony event.

6. The method of claim 1 wherein said telephone call information includes automatic number identification (ANI) information.

7. The method of claim 1 further including the step of replacing said telephone call information in said title bar with original title bar text.

8. The method of claim 1 wherein said telephone call information is obtained and displayed by executing a display information script stored on said at least one computer.

9. The method of claim 8 wherein said external module is loaded by executing a bind function script, and wherein said bind function script binds said display function to said display information script such that said telephone call information is displayed using said display function.

10. A method for non-intrusively displaying information to a user in a telecommunications system, said telecommunications system including at least one computer, said method comprising the steps of:
   executing a bind function script on said at least one computer used by said user upon detecting a system start up event, wherein the step of executing said bind function includes the steps of:
      loading an external module on said at least one computer, wherein said external module includes at least a display function; and
      binding said display function in said external module to a display information script stored on said at least one computer;
   executing said display information script on said at least one computer used by said user upon detecting an occurrence of a telephony event, wherein the step of executing said display information script includes the steps of:
      obtaining telephone call information pertaining to a telephone call routed to said user by said telecommunications system; and
      displaying said telephone call information to said user in a pre-existing active window using said display function.

11. The method of claim 10 wherein said computer is running a windows-based operating system, and wherein said external module includes a dynamic link library (DLL) having a windows text display function.

12. The method of claim 11 wherein said windows text display function controls display of text in a title bar of an active window on a display of said at least one computer used by said user, and wherein said telephone call information is displayed in said title bar of said active window.

13. The method of claim 12 wherein the step of executing said display information script further includes replacing said telephone call information in said title bar with original title bar text.

14. The method of claim 10 wherein said telephone call information includes automatic number identification (ANI) information.

15. A system for non-intrusively displaying telephone call information to a user in a telecommunications system having at least one computer, said system for non-intrusively displaying telephone call information comprising:
   means for obtaining said telephone call information pertaining to a telephone call routed to said user by said telecommunications system; and
   means for displaying said telephone call information in a title bar of a pre-existing active window on said at least one computer used by said user to whom said call is routed.

16. The method of claim 15 further comprising means for loading an external module including at least a display function, and wherein said display function is used to display said telephone call information in said title bar.

17. The method of claim 16 wherein said external module includes a dynamic link library (DLL) having a windows text display function.

18. The method of claim 15 wherein said telephone call information includes automatic number identification (ANI) information.

19. A system for non-intrusively displaying telephone call information to a user in a telecommunications system, said telecommunication system including at least one computer, said system for non-intrusively displaying telephone call information comprising:
   a bind function script, for loading an external module on said at least one computer, said external module having at least a display function;
   a display information script, for displaying telephone call information to said user at said computer using said display function of said external module;
   an event processor, for detecting a system start-up event and at least one telephony event, and for receiving said telephone call information upon occurrence of said at least one telephony event; and
   a scripting engine, responsive to detection of said system start-up event, for executing said bind function script to load said external module having said display function, and responsive to detection of said at least one telephony event, for executing said display information script to display said telephone call information to said user on a pre-existing active window at said computer using said at least one display function.

20. The system of claim 19 wherein said telephone call information includes automatic number identification (ANI) information.

21. The system of claim 19 wherein said computer is running a windows-based operating system, and wherein said external module includes a dynamic link library (DLL) having a windows text display function.

22. The system of claim 21 wherein said windows text display function controls display of text in a title bar of an active window on a display of said computer used by said user, and wherein execution of said display information script displays said telephone call information in said title bar of said active window.

23. The system of claim 19 wherein said bind function script and said display information script are stored on said at least one computer.

24. The system of claim 19 wherein said event processor and said scripting engine are executed on said at least one computer.

* * * * *